United States Patent [19]

Wright et al.

[11] 4,080,559
[45] Mar. 21, 1978

[54] TORSIONAL PROTECTIVE DEVICE FOR POWER SYSTEM STABILIZER

[75] Inventors: George F. Wright; Dale A. Swann, both of Schenectady, N.Y.

[73] Assignee: General Electric Company, Schenectady, N.Y.

[21] Appl. No.: 741,684

[22] Filed: Nov. 15, 1976

[51] Int. Cl.$^2$ .......................... H02H 7/06; H02P 9/00
[52] U.S. Cl. ...................................... 322/58; 322/25; 322/32; 361/20
[58] Field of Search ...................... 361/20, 21; 322/17, 322/19, 24, 25, 29, 32, 99, 100, 38, 58; 290/40

[56] References Cited

U.S. PATENT DOCUMENTS

| | | | |
|---|---|---|---|
| 3,167,702 | 1/1965 | Schonung et al. | 322/17 |
| 3,465,235 | 9/1969 | Schleif et al. | 322/24 |
| 3,656,048 | 4/1972 | Hauf | 322/20 X |
| 3,999,115 | 12/1976 | South et al. | 322/29 X |

Primary Examiner—Robert J. Hickey
Attorney, Agent, or Firm—James W. Mitchell; John F. Ahern; Herbert E. Messenger

[57] ABSTRACT

Power system stabilizers are used in the excitation systems of large shaft driven synchronous dynamoelectric machines for the purpose of enhancing the dynamic stability of power generating systems. Such stabilizers using speed, power or frequency as an input signal when applied with high initial response excitation systems are effective in damping low-frequency local or inter-tie mode oscillations which may occur in the system. The power system stabilizer may adversely affect torsional damping at higher frequencies. The adverse effects of a power system stabilizer at shaft torsional frequencies are obviated by providing a torsional oscillation protection device comprising a composite band-reject filter of the present invention which attenuates the power system stabilizer output at the shaft natural torsional frequencies without introducing an excessive phase lag at the local or inter-tie mode frequencies. The invention is applicable at a universal shaft pickup location and means are provided for detecting any failure in the torsional protective device whereby the power system stabilizer output may be discontinued in the event there is a failure in torsional protection.

9 Claims, 8 Drawing Figures

Fig. 4.A

| | $N_1$ | $N_2$ | $N_3$ | $N_4$ |
|---|---|---|---|---|
| WITHOUT FILTER | 0.95 | 0.71 | 0.47 | 0.06 |
| WITH FILTER | 0.0045 | 0.0042 | 0.0026 | 0.0008 |
| RATIO OF WITH/WITHOUT FILTER | 0.010 | 0.006 | 0.006 | 0.013 |

TORSIONAL PROTECTIVE DEVICE FOR POWER SYSTEM STABILIZER

BACKGROUND OF THE INVENTION

This invention relates, in general, to electric power generating systems; and, in particular, this invention relates to electric power generating stations of the type utilizing power system stabilizer devices for modifying electric generator field control signals and further relates to a means for attenuating the output of the power system stabilizer at shaft natural torsional frequencies.

In general, a power station for generating electrical power comprises a turbine, an electrical generator and an exciter which may all be interconnected by a rotating shaft. Several or more power stations may be electrically interconnected to form a power grid. Power grids may themselves be electrically interconnected. It has been found that two or more power stations electrically interconnected may be susceptible to local mode oscillations in the range of from 1 to 2 Hertz due to the effect of one large rotating mass from one power station interacting with another large rotating mass from another power station. Additionally, when one power grid is tied to a second power grid, so-called inter-tie mode oscillation may occur in the range of 0.3 to 0.5 Hertz.

The foregoing local mode and inter-tie mode oscillations may be effectively damped by utilizing a power system stabilizer. The power system stabilizer inputs a phase adjusted speed, power or frequency signal into the generator field control to provide damping for local or inter-tie mode oscillations. Power system stabilizers are documented in the literature as, for example, "System design Considerations and Operating Experience with High Performance Thyristor Excitation Systems" by Farmer, Crenshaw, Schulz and Temoshok; Volume 33, Proceedings of the American Power Conference, 1971; and, "Design of a Power System Stabilizer Sensing Frequency Deviation" by Keay and South; Volume PAS-90, No. 2, IEEE Transactions on Power Apparatus and Systems.

While power system stabilizers have been shown effective in damping local mode and inter-tie mode oscillations, in some instances they have been shown to have a destabilizing effect on torsional modes of oscillation. This has been documented in "Static Exciter Stabilizing Signals on Large Generators—Mechanical Problems" by Watson and Coultes; Volume PAS-92, pages 204-211, IEEE Transactions on Power Apparatus and Systems. Torsional mode oscillations refer to each rotating mass on a common shaft and the interaction among the rotating masses. Normally, on a common shaft of $n$ rotating masses, there will be $n-1$ modes or torsional oscillation in the subsynchronous range. These torsional oscillations may exhibit negative damping characteristics in the presence of a power system stabilizer input, and if left to grow could cause the shaft to break. In this case, it would be better to have deleted the input signal from the power system stabilizer.

One solution found in the literature relative to damping torsional oscillations suggests that a shaft speed pickup might be selectively placed at a node occurring during the first mode of torsional oscillation. This becomes a complex task, if the node physically occurs within one of the rotating masses; and further, the approach requires a complex analysis for each machine to which it is to be applied. Clearly, a universal and less complex solution is required for the electrical power generating industry with the caveat that should the solution fail, ample safeguards be present to deactivate the power system stabilizer.

SUMMARY OF THE INVENTION

The foregoing problems are susceptible to universal solution by providing a means for attenuating the power system stabilizer output at or near shaft natural torsional frequencies of oscillation. It will be shown that this can be accomplished by introducing a suitable filter element into the power system stabilizer circuitry. One such suitable filter comprises a series of biquad filter elements in cascade to define a composite band-reject filter in the range of subsynchronous torsional frequencies. The filter includes a number of staggered filter elements with each filter element tuned to a different torsional frequency. The term biquad reflects the fact that each filter element may be represented mathematically by a ratio of two quadratic equations for which both the numerator and denominator have the same natural resonant frequency. The depth of notch characteristic and the bandwidth of each filter element is controlled by the numerator and denominator damping ratios. The resonant frequencies of each element are geometrically spaced across the torsional frequency band providing a composite band-reject characteristic having the desired steep sides and relatively flat bottom. The composite filter is capable of providing attenuations of greater than 100:1 over the expected torsional frequency range while causing minimal phase lag. Moreover, the power system stabilizer may also include a band-pass filter having an inverse character to the band-reject filter to be incorporated into fail-safe circuitry.

It is one object of the invention to provide a device which will attenuate the effect of a power system stabilizer at torsional mode frequencies.

It is another object of the invention to provide a device which may be easily tuned to torsional mode frequencies for universal application to power stations without selectively modifying the position of a shaft mounted speed pickup.

It is another object of the present invention to provide a device in accordance with the foregoing objects of the invention which includes fail-safe circuitry to protect against negative damping of torsional oscillations should the torsional protection circuit fail.

Other objects, advantages and features of the present invention will become apparent from the following description of the preferred embodiment thereof when taken in connection with the accompanying drawings.

BRIEF DESCRIPTION OF THE DRAWINGS

FIGS. 4 and 4A are amplitude versus frequency plots showing the individual and composite effect of a band-reject filter according to the present invention.

DETAILED DESCRIPTION OF THE INVENTION

Figure 1:
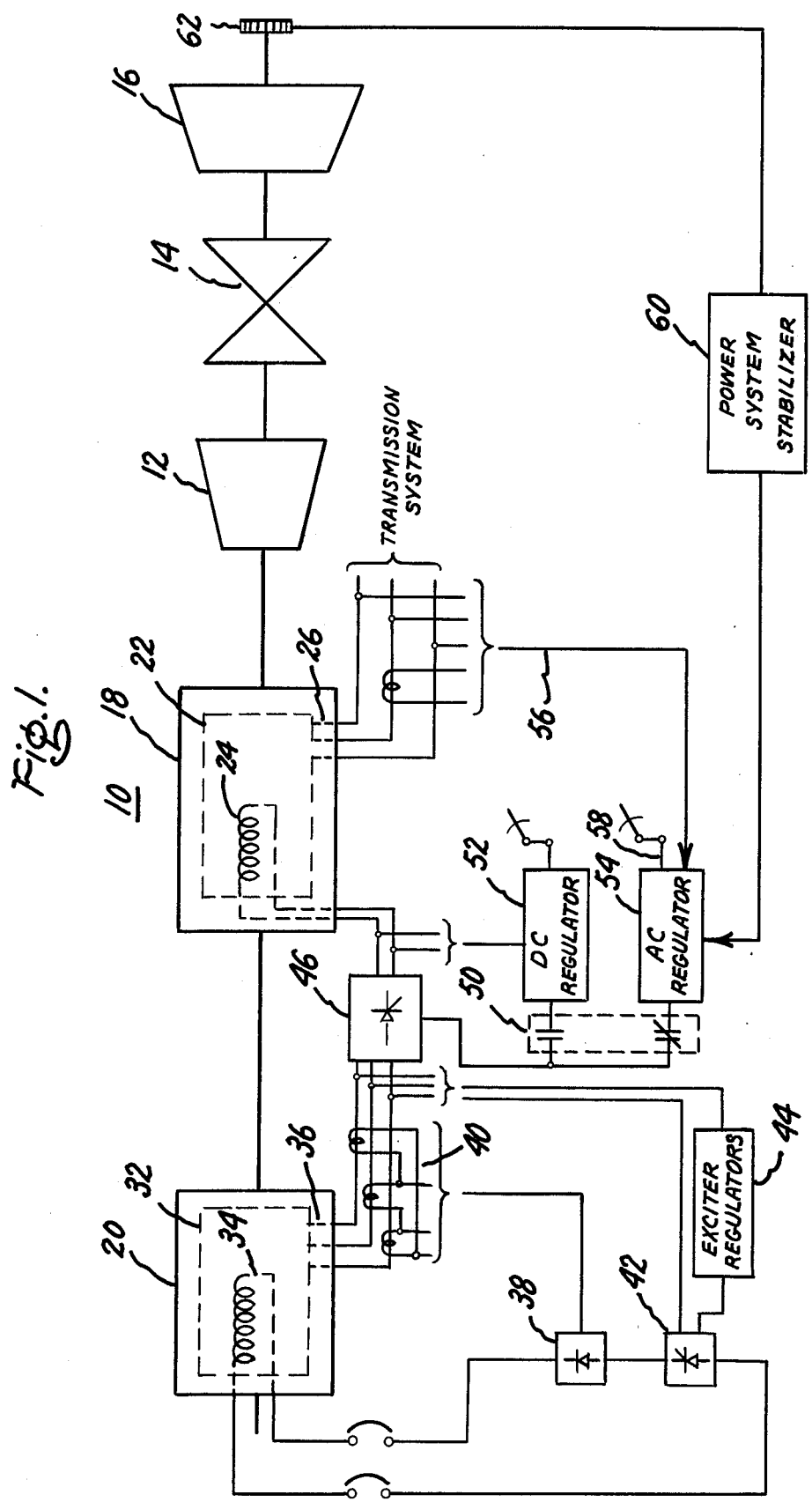
FIG. 1 is a schematic drawing of a power station showing the incorporation of a power system stabilizer.

FIG. 1 shows a power station 10 which may include a number of rotating masses such as, for example, a high-pressure turbine 12, an intermediate pressure turbine 14 and a low-pressure turbine 16. Moreover, the power station further includes an electrical generator 18 and an exciter-alternator 20. These five rotating masses are interconnected through a single composite shaft as shown. While five rotating masses are shown, it is clear that any feasible number $n$ of rotating masses may be used in the power station.

The electrical generator 18 includes a stationary armature core 22 and a rotating field winding 24 both of which are schematically illustrated. Electrical power output to a transmission system (not shown) is made through generator terminal leads 26.

The exciter alternator 20 includes a stationary armature core 32 and a rotating field winding 34 both of which are schematically illustrated. Electrical power output to the electrical generator field winding 24 is made through terminal leads 36. The exciter alternator is a direct-coupled AC synchronous generator driven from the main generator rotor. Exciter field power is supplied from the exciter armature through redundant parallel sources only one of which is shown. These sources each include a diode rectifier circuit 38 supplied from current transformers 40 and a thyristor circuit 42 supplied from exciter armature voltage. During normal operation, exciter field current control is obtained by phase control of the exciter thyristor bridge circuit. During transient conditions, such as would occur during some system distrubances, the diode circuit 38 may function to furnish additional exciter field current.

The exciter regulators 44 include an exciter AC regulator which is normally in service to provide a constant source voltage for the exciter thyristor bridges; whereas, there is also an exciter DC regulator which maintains exciter field voltage during startup or when the exciter AC regulator is not in service.

A generator thyristor assembly 46 consists of multiple bridges connected in parallel. The thyristor assembly receives a three phase input voltage from the exciter alternator and outputs a DC voltage to the generator field winding 24. A regulator transfer switch 50 selects either the master firing circuit controlled by a generator DC regulator 52 or the master firing circuit controlled by a generator AC regulator 54.

The generator DC voltage regulator 52 provides manual control by controlling firing of the thyristor bridges to hold constant generator field voltage. If the excitation system is placed in service well below synchronous speed, the DC regulator is used during startup to maintain constant generator voltage and frequency. The generator DC voltage regulator is also used when the AC regulator 54 is not available for service, or if manual control operation is desirable.

The generator AC regulator 54 has a first input on line 56 from generator terminal voltage and a second input on line 58 comprising a desired or reference voltage setpoint. A third input to the generator AC voltage regulator comprises the output of the power system stabilizer 60. The AC regulator maintains a constant output at the generator terminals such that line 56 defines a feedback loop to the AC regulator.

The power system stabilizer 60 further modifies the informational input into the AC voltage regulator by providing a speed input to the regulator taken from pickup device 62. The pickup device 62 may be any suitable conventional device known in the art or further may comprise the device shown in U.S. Pat. No. 3,885,420 to Wolfinger issued May 27, 1975 and incorporated herein by reference. The power system stabilizer supplements the AC voltage regulator with a control function so derived that, under deviations of generator speed or load, the generator excitation becomes controlled as a composite function of terminal voltage and shaft speed.

While the present embodiment has been described in terms of a specific number of rotating masses and also in terms of a specific excitation system, it should be clear that the foregoing in no way limits the scope of the invention to the specific embodiment thus far described and that any number and type of rotating masses may be employed as, for example, hydroturbines without departing from the scope of the invention. Moreover, while the present invention is most advantageously applied with a high initial response excitation system of the type shown, it may also be used to advantage in other types of excitation systems where useful.

Figure 2:
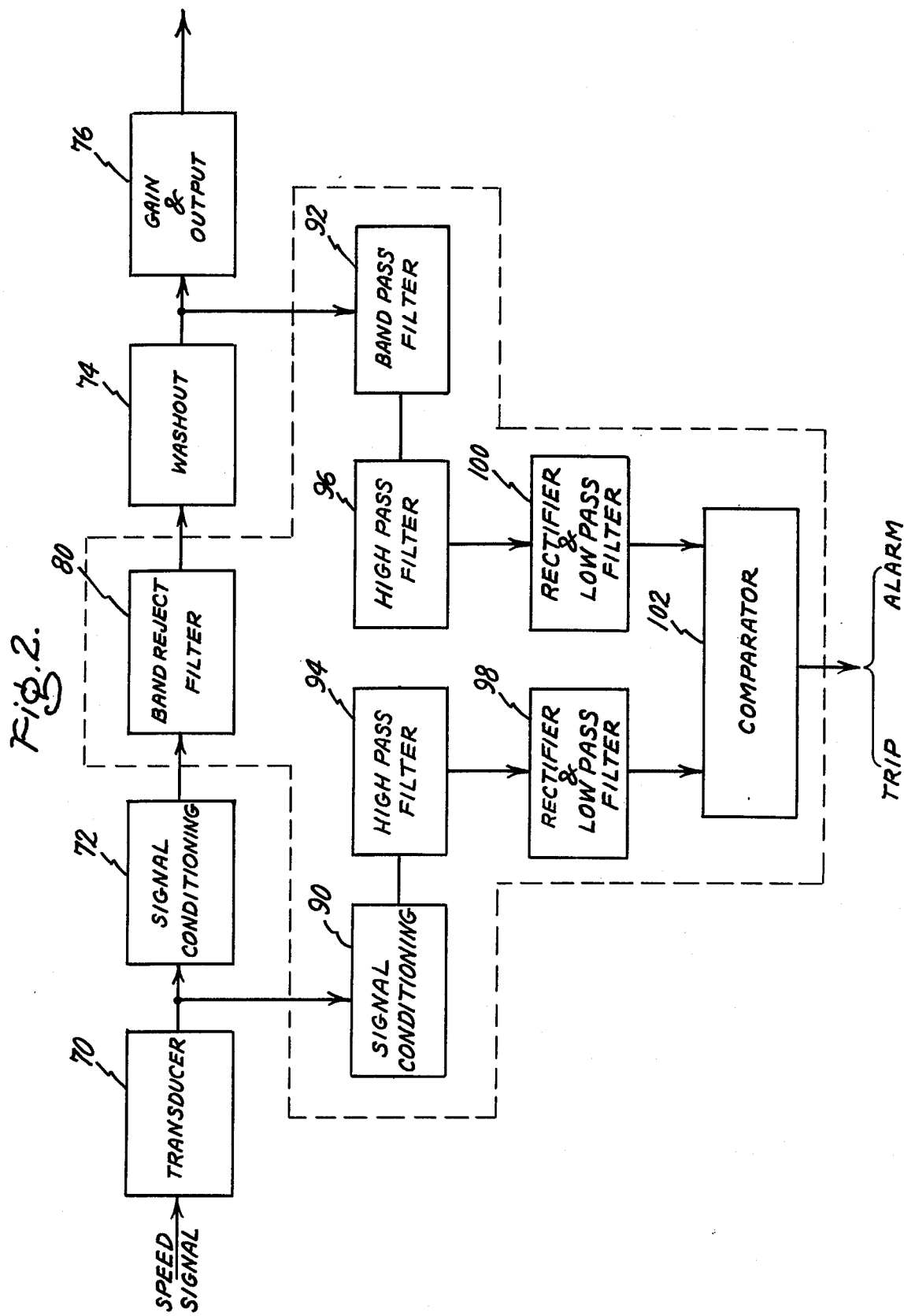
FIG. 2 is a block diagram of a power system stabilizer which includes the device of the present invention and associated protective circuitry.

FIG. 2 is a block diagram of a power system stabilizer according to the present invention showing within the boundaries of the dashed lines elements added to the conventional power system stabilizer. A speed signal is input into the power system stabilizer from a speed pickup of the type described in FIG. 1. The speed signal is first input into a frequency deviation transducer 70 wherein the input signal is frequency modulated such that the output of the transducer has a frequency equal to the modulation frequency and an amplitude proportional to the deviation in frequency. One example of such a frequency deviation transducer is given in "Design of a Power System Stabilizer Sensing Frequency Deviation" by Keay and South in IEEE Transactions on Power Apparatus and Systems, Volume PAS-90, No. 2 (Spring, 1971) at page 708.

The output of transducer 70 is input into a signal conditioning board 72. The signal conditioning board is comprised of lead-lag circuitry designed to provide a desired phase lead at inter-tie or local mode frequencies. One example of appropriate lead-lag circuitry is given in "Design of a Power System Stabilizer Sensing Frequency Deviation" by Keay and South in IEEE Transactions on Power Apparatus and Systems, Volume PAS-90, No. 2 (Spring, 1971) at page 708. In addition, in instances where a speed pickup signal is part of the transducer input, a notch filter may be useful to eliminate noise due to rotor eccentricity. For this purpose the notch filter should be set at 60 Hertz for 3600 RPM machines and at 30 Hertz for 1800 RPM machines.

Washout board 74 is a high pass filter which "washes out" or eliminates any effective change in voltage regulator reference caused by sustained off-normal frequency operation of the power system. The washout function is given by the transform ratio $ST/(1+ST)$ and is shown in FIG. 1 of "Static Exciter Stabilizing Signals on Large Generators-Mechanical Problems" by Watson and Coultes, Volume PAS-92, pages 204–211, IEEE Transactions on Power Apparatus and Systems.

The gain and output board 76 provides suitable amplification to the power system stabilizer output for input into the AC voltage regulator. Moreover, the gain and output board further includes means for limiting the maximum output voltage of the power system stabilizer. As stated previously, all of the foregoing elements are known in the art and taken in combination, these elements provide a desirable damping effect on local and inter-tie modes of oscillation. However, it is known that the application of a power system stabilizer to a power system can cause destabilization of the system at shaft natural torsional frequencies.

In order to avoid the occurrence of destabilizing signals at shaft natural torsional frequencies, a composite band-reject filter 80 has been devised for insertion into the power system stabilizer circuit. This filter is designed to attenuate the power system stabilizer output at shaft natural torsional frequencies in the range of from 15 to about 40 Hertz. Note that this continues to allow damping of inter-tie mode oscillations which are in the range of from 0.3 to 0.5 Hertz or local mode oscillations which are in the range of from 1 to 2 Hertz. The resulting torsional band-reject filter is composed of five biquad filter elements in cascade. Each biquad element can be represented mathematically by a ratio of two quadratics for which both the numerator and denominator have the same resonant frequency. A biquad filter element is the subject of copending U.S. patent application Ser. No. 642,018, filed Dec. 18, 1975, for inventors Chambers and Lane, entitled "Active Filter with Inverse Option" which is incorporated herein by reference.

Figure 3:
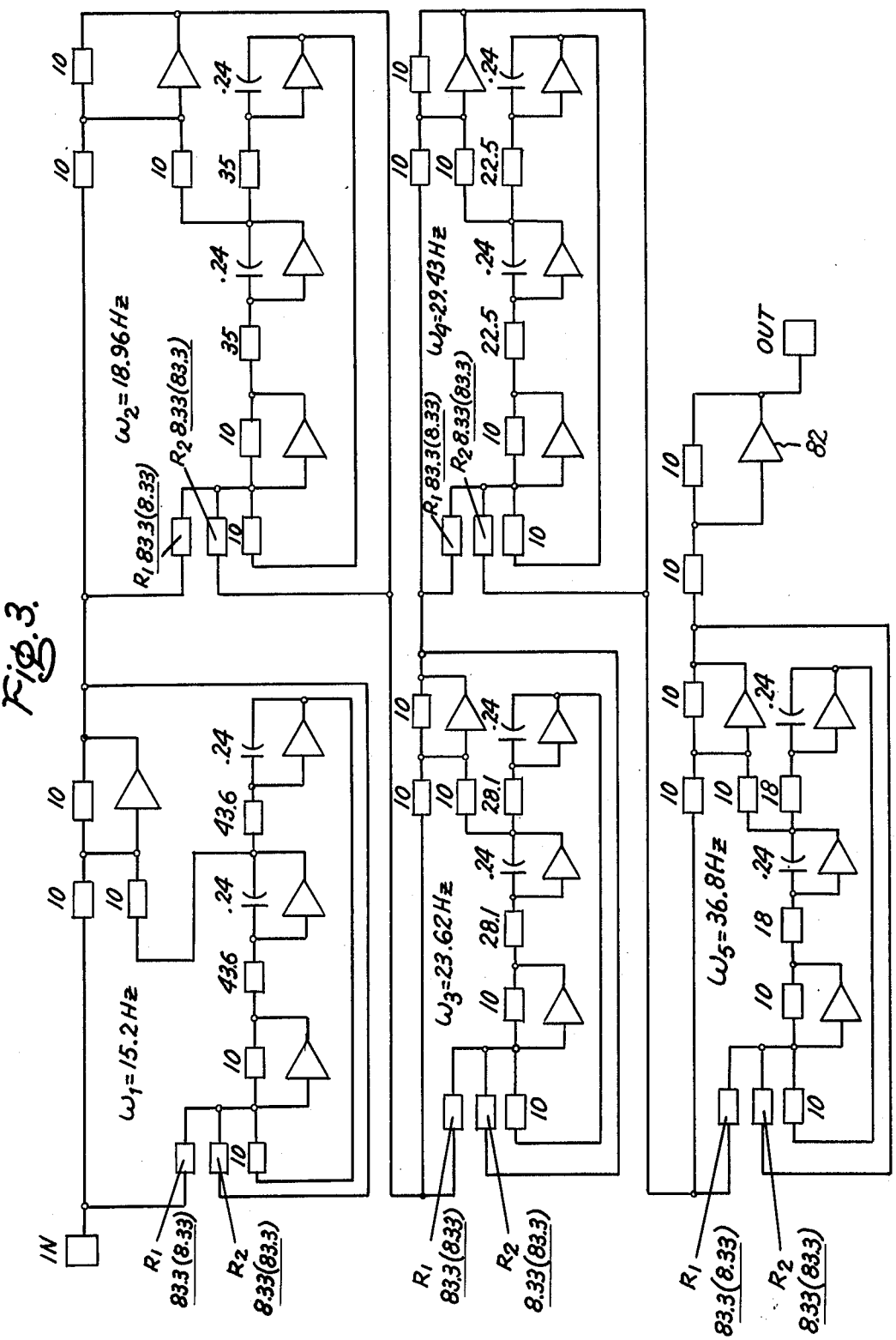
FIG. 3 is a circuit diagram of the composite biquad filter of the present invention.

Referring to FIG. 3, a circuit diagram is shown for a composite band-reject filter wherein a plurality of biquad filter elements are connected in series. Each operational amplifier is illustrated as having one input which is to the inverter terminal, whereas the normal input is not shown but in each case is connected to ground. Resistance values are given in kilo ohms and capacitance values are given in microfarads. A suitable operational amplifier is designated as Op-05 by Precision Monolithics. The number of biquad filter elements is determined by the desired bandwidth of the composite filter. Each biquad filter element may be expressed by the following function:

$$\text{Single Stage Transfer Function} = \frac{S^2 + aws + w^2}{S^2 + bws + w^2}$$

wherein $a$ and $b$ are damping factors. The tuned frequency for each biquad filter element is given in terms of $w$. Although the values given are for one particular application it is clear that they can be adjusted for any desired range of frequencies. The resistance values given in parenthesis indicate the interchangeability of the resistances to produce a band-pass filter having an inverse character to the band-reject filter for reasons which will be later shown. At the output end of the composite filter circuit, there is a buffer or isolation inverter amplifier 82.

Figure 4:
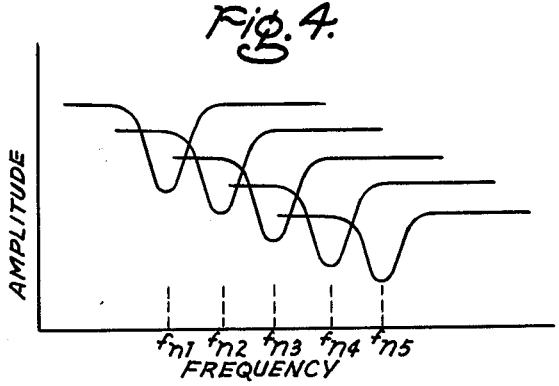

FIG. 4 is a graph which shows amplitude versus frequency for the band-reject filter wherein the individual characteristic of each biquad filter element is shown. The depth of notch and the bandwidth of each filter element are controlled by the numerator and denominator damping factors. FIG. 4A is a graph which shows amplitude versus frequency for the composite band-reject filter.

Figure 5:
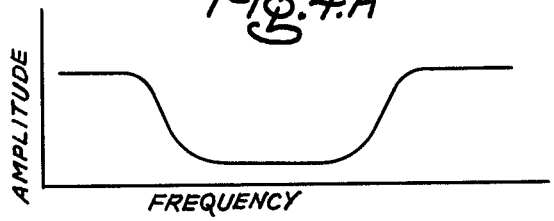
FIG. 5 is a graph which compares the output of the power system stabilizer with and without the band-reject filter.

FIG. 5 contrasts the different outputs of the power system stabilizer with the band-reject filter removed and with the band-reject filter present. The power system stabilizer output with the band-reject filter is greatly attenuated in the range of the filter design shown in FIG. 3, i.e., from 15 to 37 Hz which for one machine represents the shaft natural torsional frequencies. On the other hand, the phase lag at inter-tie mode frequencies 0.1 to 0.3 Hz is less than 5° and at local mode frequencies of 1 to 2 Hz the phase lag is less than 20°.

Figure 6:
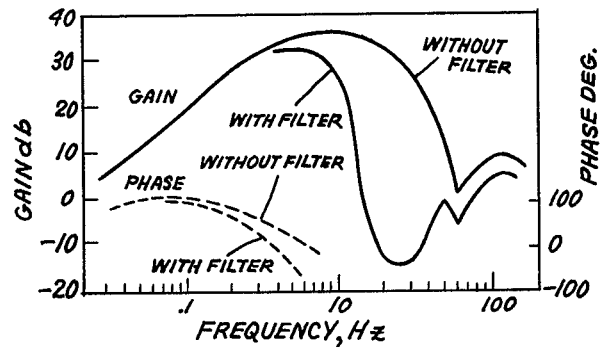
FIG. 6 is a chart showing the effect of the band-reject filter on torsion interaction phasors.

FIG. 6 shows the reduction in magnitude of torsional interaction phasors which may be in the range of from 100:1. While the addition of the band-reject filter may change the position of a phasor from a stabilizing force to a destablizing force, the magnitude of the destabilizing force will be so small as to be negligible while obviating any larger destabilizing forces which might occur without the band-reject filter.

According to the objects of the invention, it has been shown that the adverse effects generated by the power system stabilizer at shaft natural torsional frequencies can be attenuated by the addition of an appropriate band-reject filter. However, should there be a failure in the band-reject filter, the failure must be detected prior to the introduction of destabilizing signals into the system. Referring back to FIG. 2, means are provided for detecting a failure in the power system stabilizer circuit which would result in an increased magnitude of power system stabilizer output in the torsional frequency range.

The output of the transducer is input into a second signal conditioning board 90 which is identical to signal conditioning board 72. The output from the washout board 74 is input into a band-pass filter 92. Band-pass filter 92 is identical to the band-reject filter 80 shown in FIG. 3 except the resistances $R_1$ and $R_2$ for each biquad filter element are each interchanged within the filter element for the values shown in parenthesis. As is pointed out in copending U.S. patent application Ser. No. 642,018 to Chambers and Lane for an Active Filter with Inverse Option filed Dec. 18, 1975, the effect of swapping resistances causes the character of the composite filter to be inverted and hence produce a band-pass filter in the shaft natural torsional frequency range. Hence, the respective outputs of the second signal conditioning board 90 and the band-pass filter 92 become identical in the range of shaft natural torsional frequencies.

High-pass filters 94 and 96 function to decrease the sensitivity of each input channel at low frequencies thus emphasizing comparison in the torsional range of frequencies.

The rectifier and low-pass boards 98 and 100, rectify and filter the respective input signals to obtain an output signal which is a measure of average energy in the torsional band. The low-pass filter is adjusted to allow comparison to be made over a 200 to 300 millisecond time range rather than on an instantaneous basis. This function decreases the sensitivity of the comparator and tripping logic to false trips because of short duration noise pulses.

Comparator 102 takes the respective inputs from boards 98 and 100 and compares the signal level. The comparator, upon detection of a preset signal level difference in the two signals transmits trip and alarm signals to a relay for appropriate action such as interruption of the power system stabilizer output.

Figure 7:
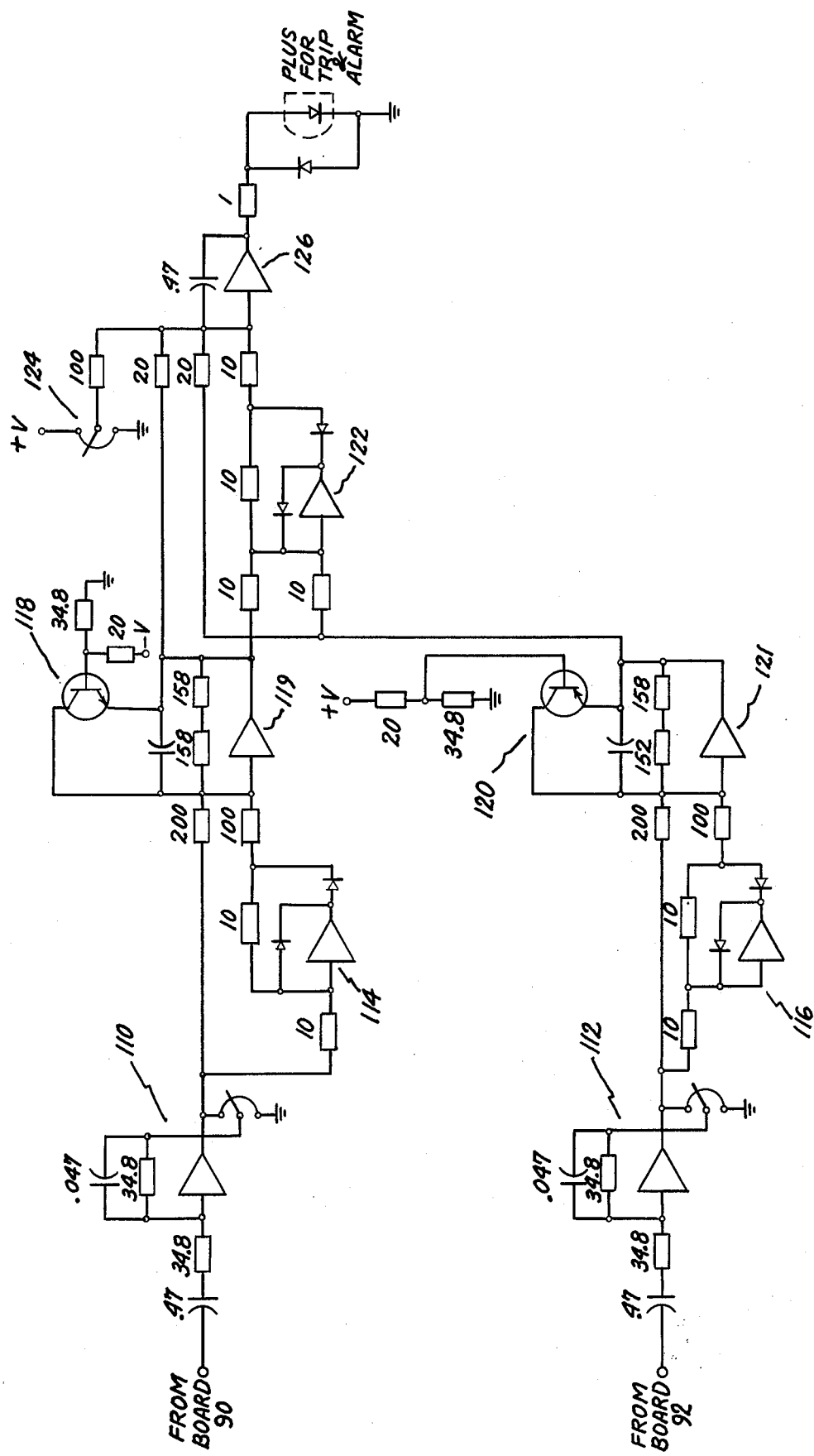
FIG. 7 shows circuitry associated with the safeguard portion of the invention.

FIG. 7 shows the implementation of the functions shown in boards 94 through 102. Resistance values are again written in kilo ohms and capacitance in microfarads. Amplifier circuits 110 and 112 provide the high-pass function whereas amplifier circuits 114 and 116 which include diodes provide rectification of respective input signals. Amplifier 119 and 121 provide the low-pass function. Transistor circuit 118 limits the output of amplifier 119 to a negative 10 volts whereas transistor circuit 120 limits the output of amplifier 121 to a positive 10 volts. The outputs of amplifiers 119 and 121 are opposite in sign and provide a net positive input to inverter amplifier 122 proportional to the difference between the two signals. The output of amplifier 122 is a negative voltage proportional to the difference between the two signals. Adjustable reference positive input 124 is added to the negative output of amplifier 122 such that if the output of amplifier 122 exceeds the reference positive input then amplifier 126 will be driven positive to turn on a warning signal and trip circuit (not shown).

From the foregoing, it is clear that a power system stabilizer is useful in damping local mode or inter-tie mode oscillations in a power system by providing a damping signal to the generator field regulator. However, it has also been documented that a power system stabilizer can have adverse effects on torsional stability at shaft torsional frequencies which destabilizing effects can be more detrimental to the power system than inter-tie or local mode oscillations. Therefore a device is necessary which will attenuate the output of the power system stabilizer at shaft natural torsional frequencies. Such a device forms one aspect of the invention and comprises a composite band-reject filter which includes a plurality of biquad filter elements which are connected in series and each, of which, is tuned to a different torsional frequency such that the composite filter covers the range of torsional frequencies. This filter is such that it does not induce an undue phase lag in the power system stabilizer output at local mode or inter-tie mode frequencies.

In order to ensure that the incorporation of the band-reject filter into the power system stabilizer will not, upon failure, allow the power system stabilizer to introduce destabilizing signals at shaft natural torsional frequencies, an alarm and trip circuit is provided as a safeguard against this possibility. The trip circuit will cause the output of the power system stabilizer to be cut off.

While there has been shown what is considered, at present, to be a preferred embodiment of the invention, other modifications may occur to those skilled in the art; and, it is intended to cover in the appended claims all such modifications as fall within the true spirit and scope of the invention.

What is claimed is:

1. In combination with a shaft driven synchronous dynamoelectric machine, a power system stabilizer provides a damping signal to the excitation control of the dynamoelectric machine for damping low frequency oscillations which may occur in the driving shaft; a torsional oscillation protection means is provided in combination with the power system stabilizer for attenuating the power system stabilizer output at higher frequency shaft torsional frequencies of oscillation wherein said torsional oscillation protection means includes:
   a composite band-reject filter comprising a plurality of biquad filter elements connected in series, wherein each filter element has a tuned frequency at or near a shaft torsional frequency whereby the band-reject filter attenuates the power system stabilizer output within the total frequency bandwidth of the shaft torsional frequencies.

2. The combination recited in claim 1 wherein the power system stabilizer further comprises:
   transducer means connected to the dynamoelectric machine and providing an output signal indicative of an input signal deviation from a reference synchronous frequency; and,
   signal conditioning means receiving said output deviation signal and providing a phase corrected output signal to said composite band-reject filter for attenuating said phase corrected output signal at shaft torsional frequencies.

3. The combination recited in claim 1 further including a composite band-pass filter comprising a plurality of biquad filter elements connected in series, wherein the composite band-pass filter has an exact inverse character to the composite band-reject filter, said band-pass filter connected in series with said band-reject filter and providing an output signal substantially indentical to the input signal of said band-reject filter at shaft torsional frequencies.

4. The combination recited in claim 3 wherein the power system stabilizer comprises in series:
   transducer means connected to the dynamoelectric machine and providing an output signal indicative of an input signal deviation from a reference synchronous frequency;
   first signal conditioning means receiving said transducer output signal and providing a phase corrected output signal;
   a high pass, washout filter for eliminating low frequency and steady-state signal components;
   an output board including signal amplifier means;
   the torsional oscillation protection means wherein the composite band-reject is connected between the first signal conditioning means and the washout filter; and, the composite band-pass filter has an input signal from the washout filter;
   second signal conditioning means, substantially identical to the first signal conditioning means, connected to receive said transducer output signal; and
   means comparing the respective output signals from the second signal conditioning means and from the composite band-pass filter whereby an output malfunction warning signal is generated upon a predetermined signal difference.

5. In combination with a shaft driven synchronous dynamoelectric machine, a power system stabilizer provides a damping signal to the excitation control of the dynamoelectric machine for damping low frequency oscillations which may occur in the driving shaft; a torsional oscillation protection means is provided in combination with the power system stabilizer for attenuating the power system stabilizer output at shaft torsional frequencies; said power system stabilizer comprising:
   speed sensing means providing an output signal proportional to shaft speed;
   transducer means converting the output speed signal into a frequency deviation signal;
   signal conditioning means receiving said frequency deviation signal and providing a phase corrected output signal;
   a composite band-reject filter receiving the output of said signal conditioning means, said filter comprising a plurality of biquad filter elements connected in series with one another, each filter element being tuned at or near a different shaft torsional frequency whereby the output of the power system stabilizer is attenuated in the shaft torsional frequency range.

6. The combination recited in claim 5 further including a composite band-pass filter having an exact inverse character to the composite band-reject filter, said band-pass filter including a plurality of biquad filter elements connected in series to one another, each filter element being tuned at or near a different shaft torsional frequency; said composite band-pass filter being connected in series to the band-reject filter whereby, at shaft torsional frequencies, the output of the band-pass filter is the same as the input to the band-reject filter.

7. The combination recited in claim 6 further comprising comparator means for comparing the input of the band-reject filter with the output of the band-pass filter, said comparator means providing an output signal whenever the output of the band-pass filter differs from the input of the band-reject filter by a predetermined amount.

8. The combination recited in claim 7 wherein the composite band-reject filter and the composite band-pass filter each comprise a plurality of biquad filter elements and wherein each filter element includes a summing circuit wherein the signal input to the filter element provides a first input to the summing circuit through a first resistor $R_1$; wherein the signal output of the filter element provides a second input to the summing circuit through a second resistor $R_2$; wherein the band-reject filter is characterized by $R_1 > R_2$ and the band-pass filter is characterized by $R_1 < R_2$ and wherein $R_1$ and $R_2$ are interchangeable with one another.

9. In combination with a shaft driven synchronous dynamoelectric machine, an improved power system stabilizer for damping local or inter-tie mode oscillations in the driving shaft; said power system stabilizer providing a phase shifted output signal in response to a frequency related input, the improvement comprising:

means for attenuating the power system stabilizer output at shaft torsional frequencies, said means including a composite band-reject filter including a plurality of biquad filter elements connected in series, wherein each filter element has a tuned frequency at or near a different shaft torsional frequency whereby the band-reject filter attenuates the power system stabilizer output within the total bandwidth of shaft torsional frequencies;

a composite band-pass filter including a plurality of biquad filter elements connected in series, wherein each filter element has a tuned frequency at or near a different shaft torsional frequency, said composite band-pass filter connected in series with said composite band-reject filter;

means for comparing the input to said band-reject filter with the output from said band-pass filter to determine a signal difference whereby if the signal difference exceeds a predetermined amount the power system stabilizer output may be interrupted.

* * * * *